United States Patent
LeCrone et al.

(10) Patent No.: US 11,595,501 B2
(45) Date of Patent: Feb. 28, 2023

(54) SINGULAR CONTROL PATH FOR MAINFRAME STORAGE

(71) Applicant: EMC IP Holding Company LLC, Hopkinton, MA (US)

(72) Inventors: Douglas E. LeCrone, Hopkinton, MA (US); Brett A. Quinn, Lincoln, RI (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/159,582

(22) Filed: Jan. 27, 2021

(65) Prior Publication Data
US 2022/0239765 A1 Jul. 28, 2022

(51) Int. Cl.
*H04L 12/24* (2006.01)
*H04L 41/0803* (2022.01)
*H04L 69/163* (2022.01)
*H04L 67/125* (2022.01)
*H04L 67/1097* (2022.01)
*H04L 69/12* (2022.01)

(52) U.S. Cl.
CPC ........ *H04L 69/163* (2013.01); *H04L 67/1097* (2013.01); *H04L 67/125* (2013.01); *H04L 69/12* (2013.01)

(58) Field of Classification Search
CPC . H04L 69/163; H04L 67/1097; H04L 67/125; H04L 69/12
USPC ........................................................ 709/230
See application file for complete search history.

(56) References Cited

U.S. PATENT DOCUMENTS

| | | | | |
|---|---|---|---|---|
| 7,702,762 B1* | 4/2010 | Jagana | ............... | H04L 69/163 370/466 |
| 2003/0014544 A1* | 1/2003 | Pettey | ............... | H04L 69/169 709/249 |
| 2009/0183173 A1* | 7/2009 | Becker | ............... | G06F 9/45558 719/313 |
| 2010/0017497 A1* | 1/2010 | Brown | ............... | H04L 12/4633 709/217 |
| 2011/0264779 A1* | 10/2011 | Noll | ............... | H04L 61/6004 709/223 |

(Continued)

FOREIGN PATENT DOCUMENTS

JP 2000148651 A * 5/2000

*Primary Examiner* — Ario Etienne
*Assistant Examiner* — Elizabeth Kassa
(74) *Attorney, Agent, or Firm* — Muirhead and Saturnelli, LLC (57) ABSTRACT

Providing TCP/IP control commands to a storage system includes intercepting TCP/IP data provided on a TCP/IP network, determining if the TCP/IP data corresponds to a control command directed to the storage system, and converting the TCP/IP data to a Fibre Channel control command that is forwarded to the storage system if the TCP/IP data is a control command directed to the storage system. A host may intercept the TCP/IP data. The host may be coupled to the storage system. The storage system may have only Fibre Channel connectivity. A PC having only TCP/IP connectivity may provide the control commands via the TCP/IP network. At least two hosts may be coupled to the TCP/IP network. Software on one of the hosts may provide the control commands for the storage system. The storage system may be coupled to an other one of the hosts.

20 Claims, 6 Drawing Sheets

(56) References Cited

U.S. PATENT DOCUMENTS

| | | | | |
|---|---|---|---|---|
| 2012/0039341 A1* | 2/2012 | Latif | ........................ | H04L 47/36 |
| | | | | 370/466 |
| 2012/0089694 A1* | 4/2012 | Pandya | ................ | H04L 69/329 |
| | | | | 709/212 |
| 2013/0117766 A1* | 5/2013 | Bax | ........................ | G06F 9/4405 |
| | | | | 719/323 |
| 2014/0122918 A1* | 5/2014 | Tsao | .................... | G06F 11/2094 |
| | | | | 714/4.11 |
| 2015/0089015 A1* | 3/2015 | Rosset | ................ | H04L 67/1097 |
| | | | | 709/215 |
| 2015/0281047 A1* | 10/2015 | Raju | ........................ | H04L 49/70 |
| | | | | 709/244 |
| 2018/0188974 A1* | 7/2018 | Cayton | ................ | G06F 3/0611 |
| 2020/0125537 A1* | 4/2020 | Busick | ................ | G06F 11/2097 |

* cited by examiner

SINGULAR CONTROL PATH FOR MAINFRAME STORAGE

TECHNICAL FIELD

This application relates to the field of computer systems and storage systems therefor and, more particularly, to the field of providing control information to storage systems.

BACKGROUND OF THE INVENTION

Host processor systems may store and retrieve data using a storage system containing a plurality of host interface units (I/O modules), disk drives, and disk interface units (disk adapters). The host systems access the storage systems through a plurality of channels provided therewith. Host systems provide data and access control information through the channels to the storage system and the storage system provides data to the host systems also through the channels. The host systems do not address the disk drives of the storage system directly, but rather, access what appears to the host systems as a plurality of logical disk units or logical devices. The logical devices may or may not correspond to any one of the actual disk drives. Allowing multiple host systems to access the single storage system allows the host systems to share data stored therein among different host processor systems.

Communication between storage systems and host systems may be provided by a Fibre Channel connection using an appropriate communication protocol, such as the ANSI FC-SB-3 Single-Byte Command Code Sets-3 Mapping Protocol for Fibre Channel, commonly known as the FICON® communication protocol. The Fibre Channel connection may be used to transmit both control commands and data being accessed by a host system at the storage system. Information is transmitted serially in frames, each having a frame header indicating whether a particular frame contains data, a control command, status information, etc.

In some cases, communication between host systems and storage systems may be supplemented by a separate TCP/IP connection at a storage system. The TCP/IP connection may be used to send and receive control commands and status information between the host systems and the storage systems in addition to using the Fibre Channel connections. Moreover, providing TCP/IP connectivity to storage systems allows communication by devices that do not have Fibre Channel connectivity. For example, the IBM Copy Services Manager software product runs on a conventional PC that does not have Fibre Channel connectivity. The PC communicates with a storage systems using TCP/IP using both a graphical interface and command line for configuring and managing copy services across storage systems.

A drawback to using TCP/IP connectivity is that some storage systems have only Fibre Channel connectivity and thus cannot be accessed using TCP/IP. Thus, for example, a storage system with no TCP/IP capabilities cannot participate in a Copy Services Manager operation initiated by a PC with no Fibre Channel capabilities. In some instances, it may be possible to retrofit a storage system with a TCP/IP connection, but this is an added expense and may require significant hardware and software changes at the storage system that are not necessarily reliable.

Accordingly, it is desirable to provide a mechanism to allow storage systems that do not have TCP/IP connectivity to be able to communicate with devices that use TCP/IP.

SUMMARY OF THE INVENTION

According to the system described herein, providing TCP/IP control commands to a storage system includes intercepting TCP/IP data provided on a TCP/IP network, determining if the TCP/IP data corresponds to a control command directed to the storage system, and converting the TCP/IP data to a Fibre Channel control command that is forwarded to the storage system if the TCP/IP data is a control command directed to the storage system. A host may intercept the TCP/IP data. The host may be coupled to the storage system. The storage system may have only Fibre Channel connectivity. A PC having only TCP/IP connectivity may provide the control commands via the TCP/IP network. At least two hosts may be coupled to the TCP/IP network. Software on one of the hosts may provide the control commands for the storage system. The storage system may be coupled to an other one of the hosts.

According further to the system described herein, a non-transitory computer readable medium contains software that, when executed, handles TCP/IP control commands to a storage system. The software includes executable code that intercepts TCP/IP data provided on a TCP/IP network, executable code that determines if the TCP/IP data corresponds to a control command directed to the storage system, and executable code that converts the TCP/IP data to a Fibre Channel control command that is forwarded to the storage system if the TCP/IP data is a control command directed to the storage system. A host may intercept the TCP/IP data. The host may be coupled to the storage system. The storage system may have only Fibre Channel connectivity. A PC having only TCP/IP connectivity may provide the control commands via the TCP/IP network. At least two hosts may be coupled to the TCP/IP network. Software on one of the hosts may provide the control commands for the storage system. The storage system may be coupled to an other one of the hosts.

According further to the system described herein, a system that handles TCP/IP control commands to a storage system includes a TCP/IP network and a first host coupled to the TCP/IP network and to the storage system, the first host having a processor and having a non-transitory computer readable medium containing software that, when executed by the processor, intercepts TCP/IP data provided on the TCP/IP network, determines if the TCP/IP data corresponds to a control command directed to the storage system, and converts the TCP/IP data to a Fibre Channel control command that is forwarded to the storage system if the TCP/IP data is a control command directed to the storage system. The storage system may have only Fibre Channel connectivity to the first host. The system may also include a second host coupled to the TCP/IP network. Software on the second host may provide the control commands for the storage system.

BRIEF DESCRIPTION OF THE DRAWINGS

Embodiments of the system are described with reference to the several figures of the drawings, noted as follows.

DETAILED DESCRIPTION OF VARIOUS EMBODIMENTS

The system described herein intercepts TCP/IP control commands, converts the control commands into Fibre Channel control commands, and provides the converted commands to a storage system via a Fibre Channel connection. Thus, devices can direct TCP/IP control commands to a storage system even though the storage system does not directly receive TCP/IP control commands.

Figure 1:
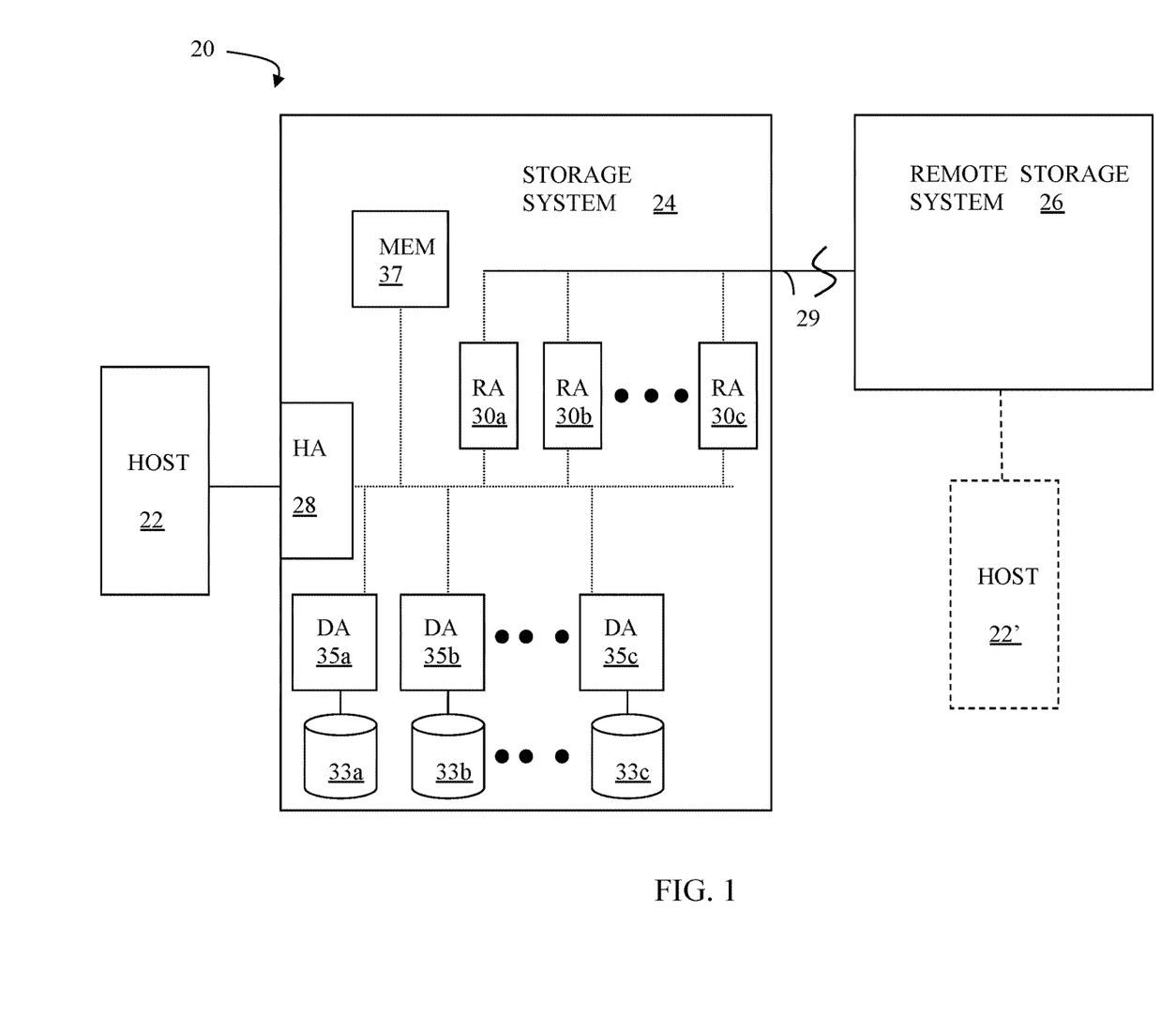
FIG. 1 is a schematic illustration showing a relationship between hosts and storage systems according to an embodiment of the system described herein.

FIG. 1 is a diagram 20 showing a relationship between a host 22 and a storage system 24 that may be used in connection with an embodiment of the system described herein. In an embodiment, the storage system 24 may be a PowerMax, Symmetrix, or VMAX storage system produced by Dell EMC of Hopkinton, Mass.; however, the system described herein may operate with other appropriate types of storage systems. Also illustrated is another (remote) storage system 26 that may be similar to, or different from, the storage system 24 and may, in various embodiments, be coupled to the storage system 24, using, for example, a network. The host 22 reads and writes data from and to the storage system 24 via an HA 28 (host adapter), which facilitates an interface between the host 22 and the storage system 24. Although the diagram 20 shows the host 22 and the HA 28, it will be appreciated by one of ordinary skill in the art that multiple host adaptors (possibly of different configurations) may be used and that one or more HAs may have one or more hosts coupled thereto.

In an embodiment of the system described herein, in various operations and scenarios, data from the storage system 24 may be copied to the remote storage system 26 via a link 29. For example, transferring data may be part of a data mirroring or replication process that causes data on the remote storage system 26 to be identical to the data on the storage system 24. Although only the one link 29 is shown, it is possible to have additional links between the storage systems 24, 26 and to have links between one or both of the storage systems 24, 26 and other storage systems (not shown). The storage system 24 may include a first plurality of remote adapter units (RA's) 30a, 30b, 30c. The RA's 30a-30c may be coupled to the link 29 and be similar to the HA 28, but are used to transfer data between the storage systems 24, 26.

The storage system 24 may include one or more physical storage units (including disks, solid state storage devices, etc.), each containing a different portion of data stored on the storage system 24. FIG. 1 shows the storage system 24 having a plurality of physical storage units 33a-33c. The storage system 24 (and/or remote storage system 26) may be provided as a stand-alone device coupled to the host 22 as shown in FIG. 1 or, alternatively, the storage system 24 (and/or remote storage system 26) may be part of a storage area network (SAN) that includes a plurality of other storage systems as well as routers, network connections, etc. (not shown in FIG. 1). The storage systems may be coupled to a SAN fabric and/or be part of a SAN fabric. The system described herein may be implemented using software, hardware, and/or a combination of software and hardware where software may be stored in a computer readable medium and executed by one or more processors.

Each of the physical storage units 33a-33c may be coupled to a corresponding disk adapter unit (DA) 35a-35c that provides data to a corresponding one of the physical storage units 33a-33c and receives data from a corresponding one of the physical storage units 33a-33c. An internal data path exists between the DA's 35a-35c, the HA 28 and the RA's 30a-30c of the storage system 24. Note that, in other embodiments, it is possible for more than one physical storage unit to be serviced by a DA and that it is possible for more than one DA to service a physical storage unit. The storage system 24 may also include a global memory 37 that may be used to facilitate data transferred between the DA's 35a-35c, the HA 28 and the RA's 30a-30c as well as facilitate other operations. The memory 37 may contain task indicators that indicate tasks to be performed by one or more of the DA's 35a-35c, the HA 28 and/or the RA's 30a-30c, and may contain a cache for data fetched from one or more of the physical storage units 33a-33c.

The storage space in the storage system 24 that corresponds to the physical storage units 33a-33c may be subdivided into a plurality of volumes or logical devices. The logical devices may or may not correspond to the storage space of the physical storage units 33a-33c. Thus, for example, the physical storage unit 33a may contain a plurality of logical devices or, alternatively, a single logical device could span both of the physical storage units 33a, 33b. Similarly, the storage space for the remote storage system 26 may be subdivided into a plurality of volumes or logical devices, where each of the logical devices may or may not correspond to one or more physical storage units of the remote storage system 26.

In some embodiments, another host 22' may be provided. The other host 22' is coupled to the remote storage system 26 and may be used for disaster recovery so that, upon failure at a site containing the host 22 and the storage system 24, operation may resume at a remote site containing the remote storage system 26 and the other host 22'. In some cases, the host 22 may be directly coupled to the remote storage system 26, thus protecting from failure of the storage system 24 without necessarily protecting from failure of the host 22.

Figure 2:
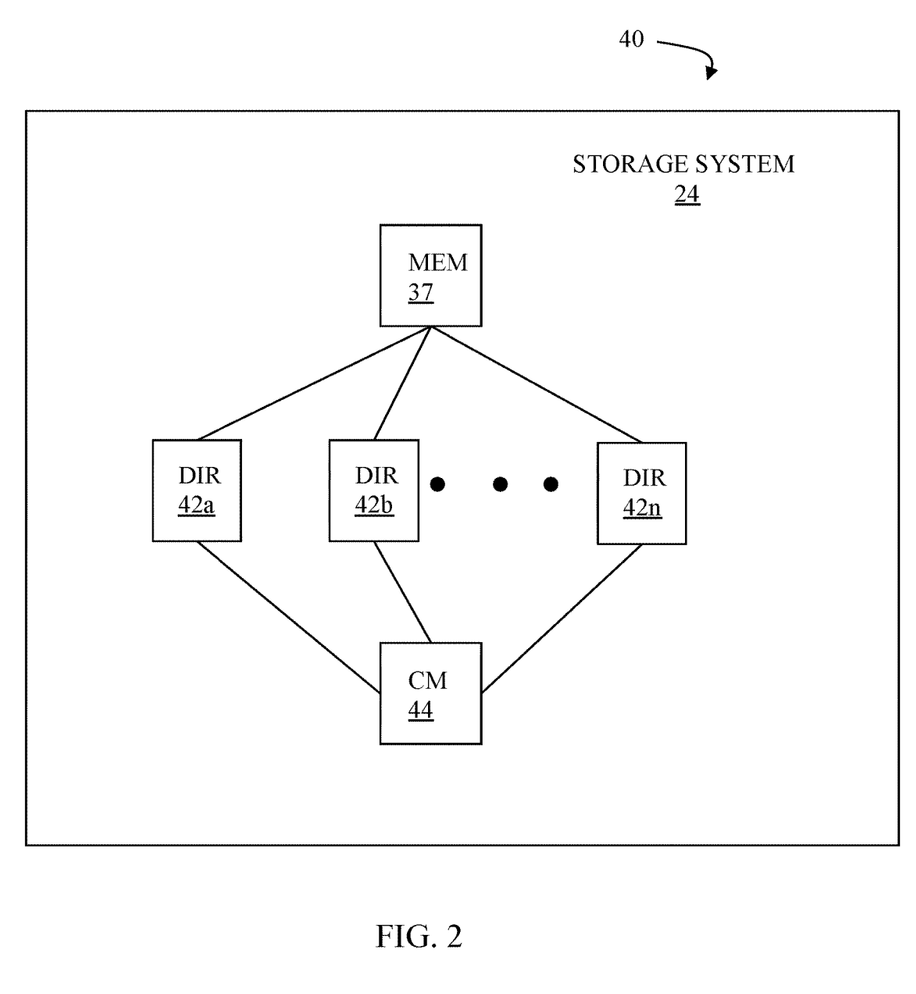
FIG. 2 is a schematic diagram illustrating a storage system where each of a plurality of directors are coupled to a memory according to an embodiment of the system described herein.

FIG. 2 is a schematic diagram 40 illustrating an embodiment of the storage system 24 where each of a plurality of directors 42a-42n are coupled to the memory 37. Each of the directors 42a-42n represents at least one of the HA 28, RAs 30a-30c, or DAs 35a-35c. The diagram 40 also shows an optional communication module (CM) 44 that provides an alternative communication path between the directors 42a-42n. Each of the directors 42a-42n may be coupled to the CM 44 so that any one of the directors 42a-42n may send a message and/or data to any other one of the directors 42a-42n without needing to go through the memory 37. The CM 44 may be implemented using conventional MUX/router technology where one of the directors 42a-42n that is sending data provides an appropriate address to cause a message and/or data to be received by an intended one of the directors 42a-42n that is receiving the data. Some or all of the functionality of the CM 44 may be implemented using one or more of the directors 42a-42n so that, for example, the directors 42a-42n may be interconnected directly with the interconnection functionality being provided on each of the directors 42a-42n. In addition, one or more of the directors 42a-42n may be able to broadcast a message to all or at least some plurality of the other directors 42a-42n at the same time.

In some embodiments, one or more of the directors 42a-42n may have multiple processor systems thereon and thus may be able to perform functions for multiple discrete directors. In some embodiments, at least one of the directors 42a-42n having multiple processor systems thereon may simultaneously perform the functions of at least two different types of directors (e.g., an HA and a DA). Furthermore, in some embodiments, at least one of the directors 42a-42n having multiple processor systems thereon may simultaneously perform the functions of at least one type of director and perform other processing with the other processing system. In addition, all or at least part of the global memory 37 may be provided on one or more of the directors 42a-42n and shared with other ones of the directors 42a-42n. In an embodiment, the features discussed in connection with the storage system 24 may be provided as one or more director boards having CPUs, memory (e.g., DRAM, etc.) and interfaces with Input/Output (I/O) modules.

Note that, although specific storage system configurations are disclosed in connection with FIGS. 1 and 2, it should be understood that the system described herein may be implemented on any appropriate platform. Thus, the system described herein may be implemented using a platform like that described in connection with FIGS. 1 and 2 or may be implemented using a platform that is somewhat or even completely different from any particular platform described herein.

A storage area network (SAN) may be used to couple one or more host systems with one or more storage systems in a manner that allows reconfiguring connections without having to physically disconnect and reconnect cables from and to ports of the devices. A storage area network may be implemented using one or more switches to which the storage systems and the host systems are coupled. The switches may be programmed to allow connections between specific ports of devices coupled to the switches. A port that can initiate a data-path connection may be called an "initiator" port while the other port may be deemed a "target" port.

Figure 3:
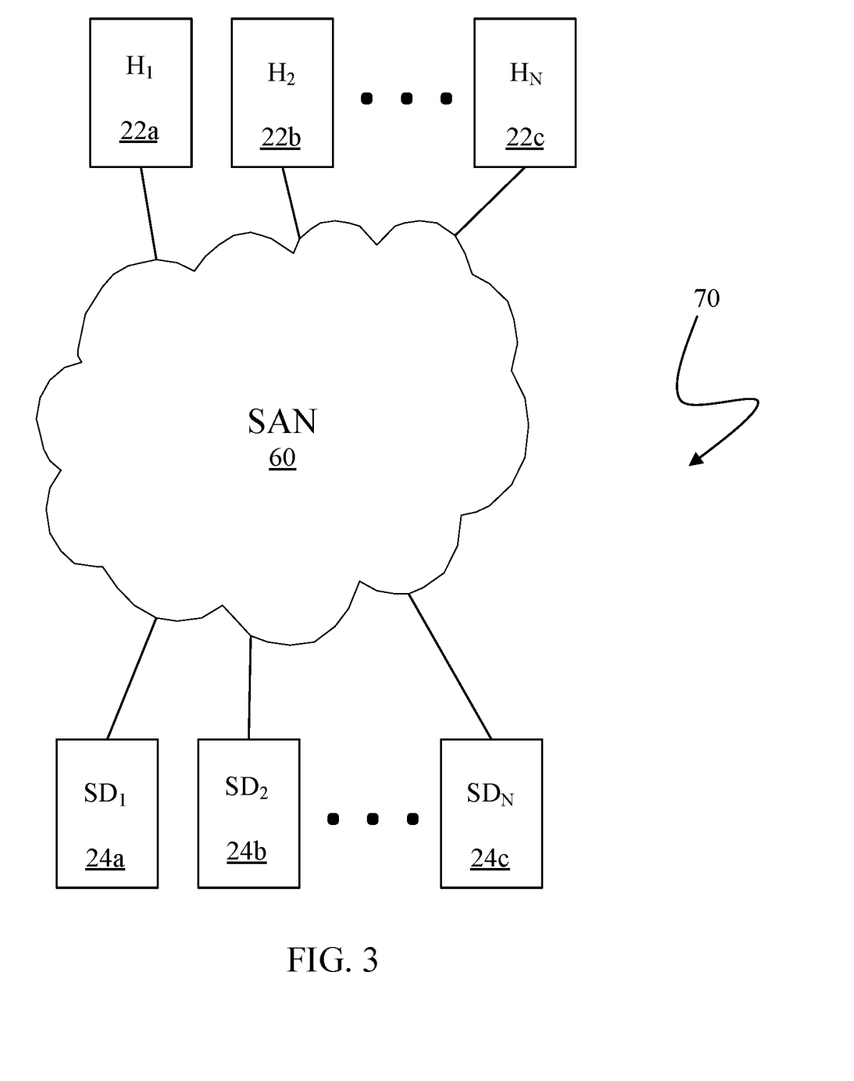
FIG. 3 is a schematic illustration showing a storage area network (SAN) providing a SAN fabric coupling a plurality of host systems to a plurality of storage systems that may be used in connection with an embodiment of the system described herein.

FIG. 3 is a schematic illustration 70 showing a storage area network (SAN) 60 providing a SAN fabric coupling a plurality of host systems ($H_1$-$H_N$) 22a-c to a plurality of storage systems ($SD_1$-$SD_N$) 24a-c that may be used in connection with an embodiment of the system described herein. Each of the devices 22a-c, 24a-c may have a corresponding port that is physically coupled to switches of the SAN fabric used to implement the storage area network 60. The switches may be separately programmed by one of the devices 22a-c, 24a-c or by a different device (not shown). Programming the switches may include setting up specific zones that describe allowable data-path connections (which ports may form a data-path connection) and possible allowable initiator ports of those configurations. For example, there may be a zone for connecting the port of the host 22a with the port of the storage system 24a. Upon becoming activated (e.g., powering up), the host 22a and the storage system 24a may send appropriate signals to the switch(es) of the storage area network 60, and each other, which then allows the host 22a to initiate a data-path connection between the port of the host 22a and the port of the storage system 24a. Zones may be defined in terms of a unique identifier associated with each of the ports, such as such as a world-wide port name (WWPN).

Figure 4:
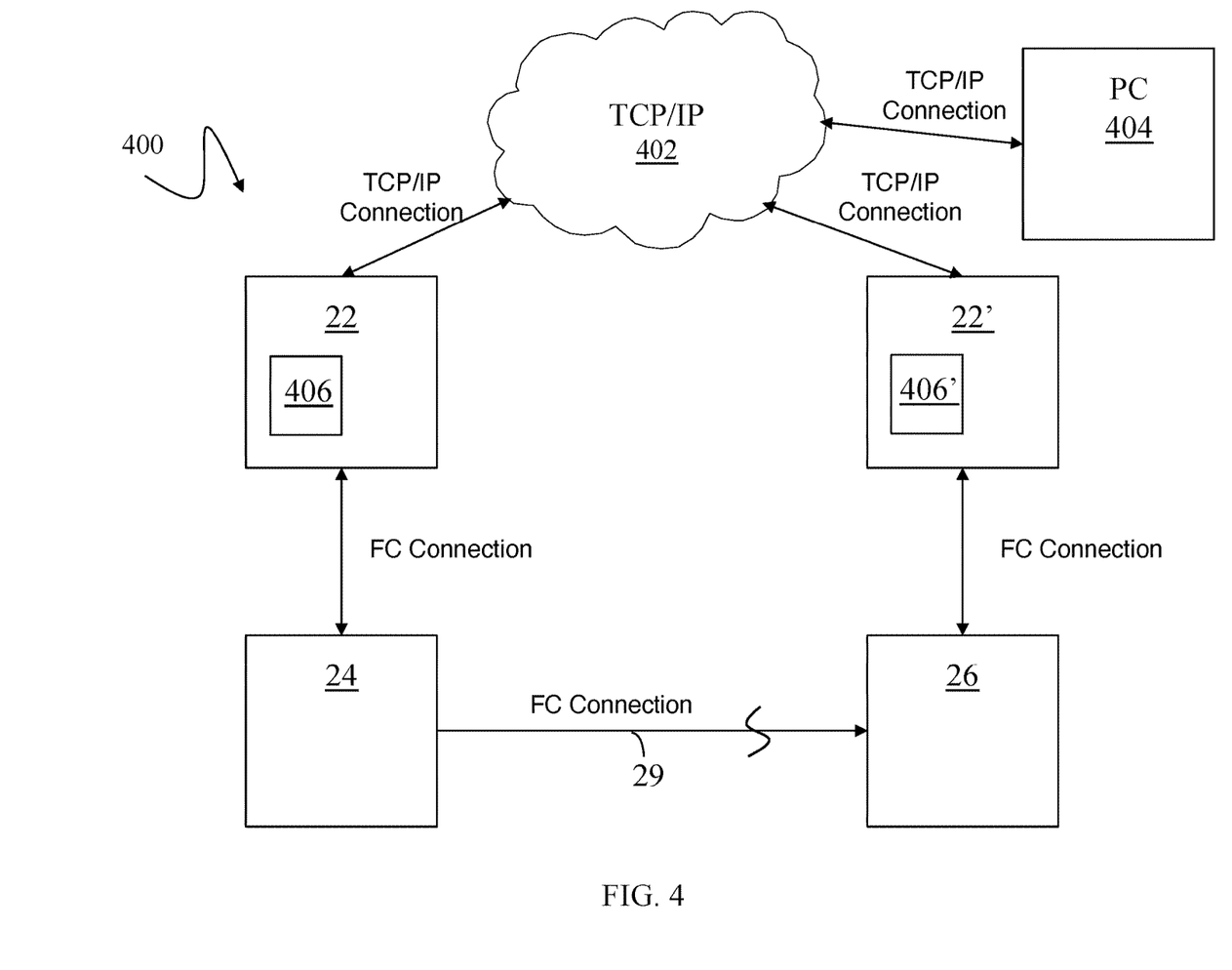
FIG. 4 is a schematic illustration showing a relationship between hosts, storage systems, a TCP/IP network, and a PC according to an embodiment of the system described herein.

Referring FIG. 4, a diagram 400 shows the hosts 22, 22', the storage systems 24, 26, and the link 29 discussed above. The storage system 24 may be coupled to the host 22 via a Fibre Channel connection and the storage system 26 may be coupled to the host 22' via a Fibre Channel connection. The link 29 that connects the storage systems 24, 26 may also be a Fibre Channel connection. The Fibre Channel connections may use any appropriate communication protocol, such as the ANSI FC-SB-3 Single-Byte Command Code Sets-3 Mapping Protocol for Fibre Channel, commonly known as the FICON® communication protocol.

The diagram 400 also shows a TCP/IP network 402, which could be a private TCP/IP network or could be a public network, such as the Internet. The hosts 22, 22' are coupled to the network 402 using any appropriate TCP/IP mechanism, such as an OSA (Open Systems Adaptor) provided in connection with an IBM computing system running the Z/OS operating system. The diagram 400 also shows a PC 404 coupled to the TCP/IP network 402. The host 22 is shown as including a software module 406 while the host 22' is shown as including a software module 406'. The software modules 406, 406' are described in more detail elsewhere herein.

In an embodiment herein, the PC 404 may issue control commands through the network 402 that are meant to be received by the storage systems 24, 26, which in this case do not have TCP/IP connectivity to the network 402, but only have Fibre Channel connectivity to the respective ones of the storage systems 22, 22'. However, as explained in more detail elsewhere herein, the control commands for the storage systems 24, 26 that are issued by the PC 404 may be intercepted by the hosts 22, 22' and forwarded to the storage systems 24, 26 via the Fibre Channel connections. The software module 406 on the host 22 intercepts TCP/IP control commands intended for the storage system 24, converts the control commands to Fibre Channel commands, and sends the converted commands to the storage system 24 via the Fibre Channel connection. Similarly, the software module 406' on the host 22' intercepts TCP/IP control commands intended for the storage system 26, converts the control commands to Fibre Channel commands, and sends the converted commands to the storage system 26 via the Fibre Channel connection.

Figure 5:
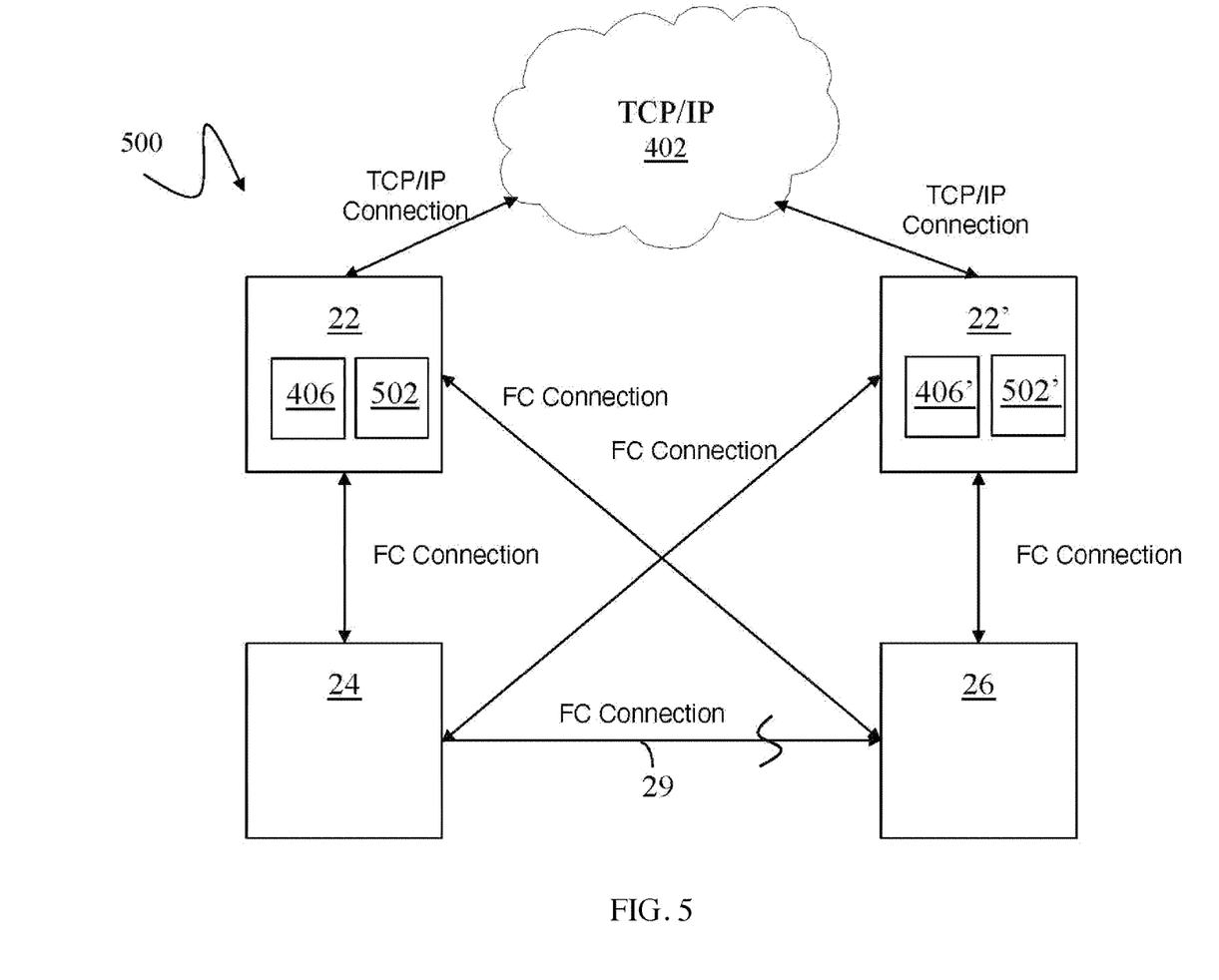
FIG. 5 is a schematic illustration showing a relationship between hosts, storage systems, and a TCP/IP network, according to an embodiment of the system described herein.

Referring to FIG. 5, a diagram 500 illustrates another configuration that includes the TCP/IP network 402, the software modules 406, 406', the hosts 22, 22' and the storage systems 24, 26, discussed above. The storage system 24 may be coupled to the hosts 22, 22' via Fibre Channel connections and the storage system 26 may be coupled to the hosts 22, 22' via Fibre Channel connections. The link 29 that connects the storage systems 24, 26 may also be a Fibre Channel connection. The Fibre Channel connections may use any appropriate communication protocol, such as the ANSI FC-SB-3 Single-Byte Command Code Sets-3 Mapping Protocol for Fibre Channel, commonly known as the FICON® communication protocol.

The host 22 may be running a software module 502 while the host 22' is running a software module 502'. The software modules 502, 502' may handle, for example, copying/transferring data between the storage systems 24, 26, failover from one of the storage systems 24, 26 to an other one of the storage systems 24, 26, etc. In some cases, one or both of the software modules 502, 502' may not have Fibre Channel connectivity to one or both of the storage systems 24, 26. However, as described in more detail herein, it may still be possible for the software modules 502, 502' to provide control commands using the TCP/IP network 402. For example, the software module 502 may provide a TCP/IP control command via the network 402 to the storage system 26. The software module 502 issues the TCP/IP control command which travels over the network 402 and is intercepted by the software module 406' on the host 22'. The software module 406' converts the control command to a Fibre Channel command and sends the converted command to the storage system 26 via the Fibre Channel connection.

Figure 6:
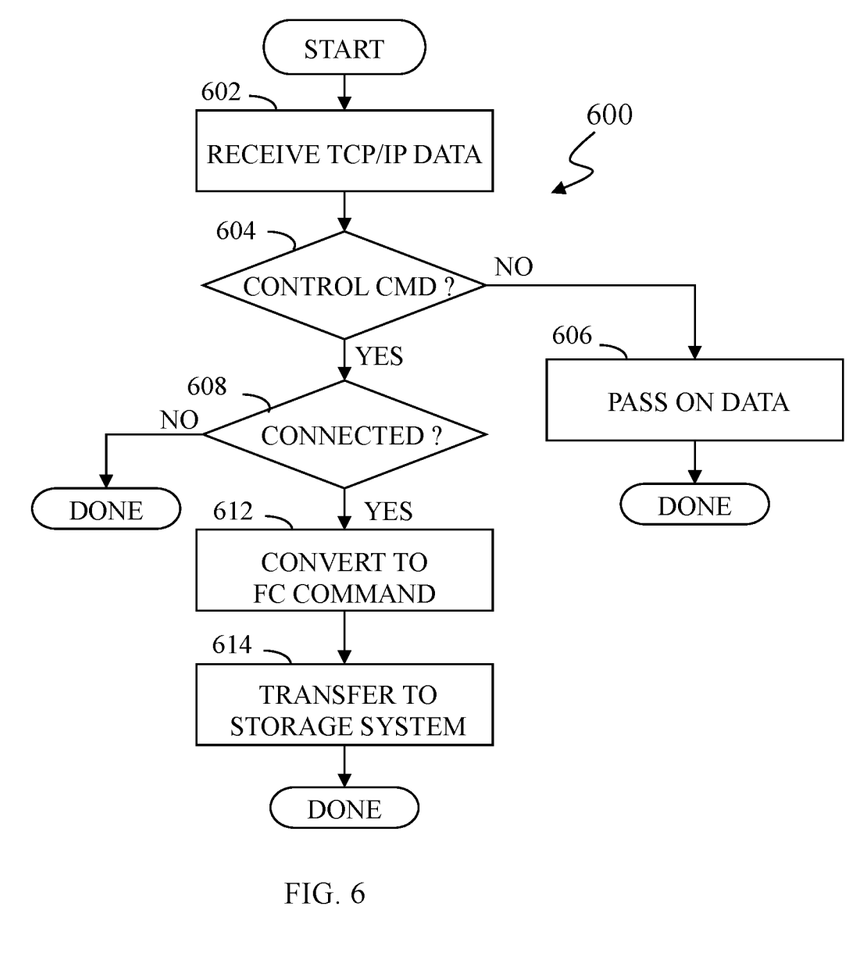
FIG. 6 is a flow diagram illustrating processing performed in connection with intercepting TCP/IP data, converting control commands, and providing the converted commands to a storage system according to an embodiment of the system described herein.

Referring to FIG. 6, a flow diagram 600 illustrates processing performed by the software module 406 or the software module 406' in connection with intercepting control commands, converting the control commands, and forwarding the converted commands to a storage system that is connected by a Fibre Channel. Processing begins at a first step 602 where the software module intercepts TCP/IP data. Following the step 602 is a test step 604 where it is determined if the intercepted TCP/IP data is a control command. In an embodiment herein, the software modules 406, 406' intercept all TCP/IP data and handle command conversion and forward via Fibre Channel only TCP/IP data corresponding to control commands directed to a storage system attached to the host containing the corresponding one of the software modules 406, 406'. Thus, for example, the software module 406 intercepts TCP/IP data but converts and forwards only control commands destined for the storage system 24. Note that, in some embodiments, the amount of data received by the software modules 406, 406' may be reduced by listening only on a particular port or subset of ports that are used for storage system control commands.

If it is determined at the test step 604 that that the TCP/IP data that has been intercepted is not a control command, then control transfers from the test step 604 to a step 606 where the data is passed on to the original destination of the data (i.e., the TCP/IP data is processed as if it had not been intercepted). Following the step 606, processing is complete. If it is determined at the test step 604 that that the TCP/IP data that has been intercepted is a control command, then control transfers from the test step 604 to a test step 608 where it is determined if the control command is for a storage system coupled to the host running the software. If not, then processing is complete (i.e., the command is ignored). Otherwise, control transfers from the test step 608 to a step 612 where the TCP/IP command is converted to a Fibre Channel command. Following the step 612 is a step 614 where the converted command is forwarded to the appropriate storage system that is coupled to the host via the Fibre Channel connection. Following the step 614, processing is complete.

Various embodiments discussed herein may be combined with each other in appropriate combinations in connection with the system described herein. Additionally, in some instances, the order of steps in the flow diagrams, flowcharts and/or described flow processing may be modified, where appropriate. Further, various aspects of the system described herein may be implemented using software, hardware, a combination of software and hardware and/or other computer-implemented modules or devices having the described features and performing the described functions. The system may further include a display and/or other computer components for providing a suitable interface with a user and/or with other computers.

Software implementations of the system described herein may include executable code that is stored in a non-transitory computer-readable medium and executed by one or more processors. The computer-readable medium may include volatile memory and/or non-volatile memory, and may include, for example, a computer hard drive, ROM, RAM, flash memory, portable computer storage media such as a CD-ROM, a DVD-ROM, an SD card, a flash drive or other drive with, for example, a universal serial bus (USB) interface, and/or any other appropriate tangible or non-transitory computer-readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method for providing TCP/IP control commands to a first storage system, comprising:
    providing a first host with TCP/IP connectivity to a TCP/IP network, the first host also having Fibre Channel connectivity directly to the first storage system to exchange data between the first host and the first storage system;
    the first host intercepting TCP/IP data from a separate device coupled to the TCP/IP network that provides control commands for the first storage system via the TCP/IP network;
    determining a first condition that is true only if the TCP/IP data corresponds to a control command directed to the first storage system;
    determining a second condition that is true only if the first host has a Fibre Channel connection directly to the first storage system for transferring data directly between the first host and the first storage system; and
    the first host converting the TCP/IP data from the separate entity to a Fibre Channel control command and writing the Fibre Channel control command directly from the first host to the first storage system via the Fibre Channel connection only if the first condition is true and the second condition is true.

2. A method, according to claim 1, wherein the separate device is a PC having only TCP/IP connectivity.

3. A method, according to claim 1, wherein the separate device is a second host is coupled to the TCP/IP network and coupled to a second storage system.

4. A method, according to claim 3, wherein software on the second host provides the TCP/IP control commands for the first storage system.

5. A method, according to claim 4, wherein the first storage system provides Fibre Channel connectivity only to the first host.

6. A method, according to claim 5, wherein a second storage system provides Fibre Channel connectivity only to the second host.

7. A method, according to claim 6, wherein the first host provides TCP/IP commands from the second host to the first storage system using Fibre Channel connectivity between the first host and the first storage system and the second host provides TCP/IP commands to the second storage system using Fibre Channel connectivity between the second host and the second storage system.

8. A non-transitory computer readable medium containing software that, when executed, handles TCP/IP control commands to a first storage system, the software comprising:
    executable code provided on a first host having TCP/IP connectivity to a TCP/IP network and Fibre Channel connectivity directly to the first storage system to exchange data between the first host and the first storage system;

executable code that intercepts TCP/IP data from a separate device coupled to the TCP/IP network that provides control commands for the first storage system via the TCP/IP network;

executable code that determines a first condition that is true only if the TCP/IP data corresponds to a control command directed to the first storage system;

executable code that determines a second condition that is true only if the first host has a Fibre Channel connection directly to the first storage system for transferring data directly between the first host and the first storage system; and executable code provided on the first host that converts the TCP/IP data from the separate entity to a Fibre Channel control command and writing the Fibre Channel control command directly from the first host to the first storage system via the Fibre Channel connection only if the first condition is true and the second condition is true.

9. A non-transitory computer readable medium, according to claim 8, wherein the separate device is a PC having only TCP/IP connectivity.

10. A non-transitory computer readable medium, according to claim 8, wherein the separate device is a second host is coupled to the TCP/IP network and coupled to a second storage system.

11. A non-transitory computer readable medium, according to claim 10, wherein software on the second host provides the TCP/IP control commands for the first storage system.

12. A non-transitory computer readable medium, according to claim 11, wherein the first storage system provides Fibre Channel connectivity only to the first host.

13. A non-transitory computer readable medium, according to claim 12, wherein a second storage system provides Fibre Channel connectivity only to the second host.

14. A non-transitory computer readable medium, according to claim 13, wherein the first host includes executable code that provides TCP/IP commands from the second host to the first storage system using Fibre Channel connectivity between the first host and the first storage system and the second host includes executable code that provides TCP/IP commands to the second storage system using Fibre Channel connectivity between the second host and the second storage system.

15. A system that handles TCP/IP control commands to a first storage system, comprising:

a TCP/IP network; and a first host having Fibre Channel connectivity directly to the first storage system to exchange data between the first host and the first storage system and coupled to the TCP/IP network and to the first storage system, the first host having a processor and having a non-transitory computer readable medium containing software that, when executed by the processor, intercepts TCP/IP data provided on the TCP/IP network by a separate device coupled to the TCP/IP network that provides control commands for the first storage system via the TCP/IP network, determines a first condition that is true only if the TCP/IP data corresponds to a control command directed to the first storage system, determines a second condition that is true only if the first host has a Fibre Channel connection directly to the first storage system for transferring data directly between the first host and the first storage system, and converts the TCP/IP data from the separate entity to a Fibre Channel control command and writing the Fibre Channel control command directly from the first host to the first storage system via the Fibre Channel connection only if the first condition is true and the second condition is true.

16. A system, according to claim 15, wherein the separate device is a second host coupled to the TCP/IP network.

17. A system, according to claim 16, wherein software on the second host provides the TCP/IP control commands for the first storage system.

18. A system, according to claim 17, wherein the first storage system provides Fibre Channel connectivity only to the first host.

19. A system, according to claim 18, wherein a second storage system provides Fibre Channel connectivity only to the second host.

20. A system, according to claim 19, wherein the first host includes executable code that provides TCP/IP commands from the second host to the first storage system using Fibre Channel connectivity between the first host and the first storage system and the second host includes executable code that provides TCP/IP commands to the second storage system using Fibre Channel connectivity between the second host and the second storage system.

* * * * *